United States Patent [19]
Lee

[11] Patent Number: 6,108,857
[45] Date of Patent: Aug. 29, 2000

[54] WINTER WINDSHIELD WIPER FOR USE IN A MOTOR VEHICLE

[76] Inventor: Albert I. Lee, 232 Margate Rd., Timonium, Md. 21093

[21] Appl. No.: 09/177,370

[22] Filed: Oct. 23, 1998

[51] Int. Cl.[7] .................. B60S 1/38; B60S 1/40
[52] U.S. Cl. .................. 15/250.201; 15/250.44
[58] Field of Search .......... 15/250.201, 250.44, 15/250.32, 250.43, 250.361

[56] References Cited

U.S. PATENT DOCUMENTS

| | | |
|---|---|---|
| 5,311,636 | 5/1994 | Lee . |
| 5,332,328 | 7/1994 | Yang ..................... 15/250.32 |
| 5,564,157 | 10/1996 | Kushida ................. 15/250.201 |
| 5,613,266 | 3/1997 | Lee . |

FOREIGN PATENT DOCUMENTS

| 4223766 | 1/1993 | Germany ............... 15/250.201 |
|---|---|---|

*Primary Examiner*—Gary K. Graham
*Attorney, Agent, or Firm*—Birch, Stewart, Kolasch & Birch, LLP

[57] ABSTRACT

An improved windshield wiper assembly for a motor vehicle which includes a connecting member connected to a wiper arm of the motor vehicle. A frame of the windshield wiper assembly is sealed by a rubber sheet disposed under the connecting member, and a bridge member is fixed between the connecting member and the rubber sheet. The bridge member includes a pair of flexible, elongated vanes which extend downwardly and at an angle from a front surface thereof, and a plurality of pairs of holes disposed on the top surface of the bridge member. The vanes direct the flow of air through the holes in the bridge member, thereby increasing air pressure on the wiper blade and improving the performance of the windshield wiper assembly.

14 Claims, 1 Drawing Sheet

WINTER WINDSHIELD WIPER FOR USE IN A MOTOR VEHICLE

BACKGROUND OF THE INVENTION

1. Field of the Invention

The present invention relates to the construction of a winter windshield wiper assembly for use in a motor vehicle. More particularly, the present invention relates to a winter windshield wiper assembly having a mechanism for ensuring that the winter windshield wiper assembly remains in contact with the windshield of the motor vehicle. The present invention includes a bridge member with at least one pair of elongated vanes extending outwardly and downwardly at an angle from a front wall of the bridge member. The vanes apply a force to the winter windshield wiper assembly when the motor vehicle is in operation to ensure contact with the windshield. Accordingly, the vanes help to effectively clean and wipe the convex surface of the windshield of the motor vehicle, especially when in a cold climate or in the winter time. In addition, the operation life of the windshield wiper assembly is increased.

2. Description of the Related Art

Generally, various types of windshield wiper frames for a windshield wiper assembly are well known. Such windshield wiper frames include a bridge, a pair of primary yokes pivotally connected to the bridge, a pair of secondary yokes pivotally connected to one end of each primary yoke, a mounting stay mounted on the other end of each primary yoke and mounting stays mounted on each end of the secondary yokes. However, such conventional art wiper frames suffer from poor cleaning performance by the windshield wiper blade due to inadequate pressure on the windshield.

In order to improve cleaning performance, one known windshield wiper frame, as shown in FIG. 1 of the present invention, is equipped with a bridge having a pair of vanes extending up from the rear walls thereof. However, this wiper frame suffers from a number of problems. For example, as air flowing past the vehicle presses down on the pair of vanes, the entire upper portion of the wiper frame is also pressed down toward the glass, causing the entire frame to pivot slightly. Therefore, the lower portion of the wiper frame, and the wiper blade itself may be lifted slightly away from the glass, thereby preventing the wiper blade from effectively cleaning the convex surface of the windshield glass. This pivoting can result in decreased operational life of the wiper arm. In addition, the known bridge with vanes lacks openings disposed on the top of the bridge. These openings are needed to maintain the pressure balance on the two sides of the bendable lip of the blade so as to achieve an effective cleaning operation.

The present inventor has owned U.S. Pat. No. 5,311,636 disclosing a windshield wiper frame for use in a windshield wiper assembly for motor vehicles which includes a pair of primary yokes, and a bridge member pivotally connected to the pair of primary yokes. Furthermore, at least one elongated vane extends downwardly and at a slant from the front wall of the bridge member. This windshield wiper assembly can efficiently wipe the convex surface of the windshield glass and extend the operational life of the windshield wiper assembly. However, this windshield wiper frame may not be completely effective in the winter time or where there is heavy snow.

Also, the present inventor is the owner of U.S. Pat. No. 5,613,266 which discloses a winter windshield wiper for use in a motor vehicle including a rubber sheet sealed windshield wiper frame having a wiper blade thereon. A connecting member is attached to an upper surface of the frame. A horizontally elongated vane member having at least one wing is secured to the frame in order to improve the effectiveness of cleaning and to extending the operation life of the windshield wiper. However, this device also suffers from some of the above-mentioned problems.

SUMMARY OF THE INVENTION

Accordingly, it is an object of the present invention to provide an improved winter windshield wiper assembly which eliminates the problems encountered with the conventional winter windshield wiper. In order to accomplish these objects, the winter windshield wiper assembly for a motor vehicle of the present invention includes having at least one contoured and flexible vane and at least a pair of holes disposed on the top surface thereof.

Another object of the present invention is to provide an improved winter windshield wiper assembly including a connecting member, a rubber sheet sealed windshield wiper frame, and a bridge member having at least one pair of elongated vanes which extend downwardly and at an angle from a front wall thereof. In addition, at least one pair of horizontally elongated holes are disposed on the top surface of the bridge for effectively cleaning and wiping the convex surface of the windshield of a motor vehicle and for extending the operation life of the windshield wiper assembly.

A further object of the present invention is to provide an improved winter windshield wiper assembly, which is simple in structure, inexpensive to manufacture, easy to use, and refined in appearance.

Another object of the present invention is to provide the elongated vane members attachable to a conventional winter windshield wiper. This provides an inexpensive method of improving the operation of existing winter windshield wipers.

Briefly described, the present invention is directed to an improved windshield wiper assembly for a motor vehicle, which includes a wiper arm attached to a body of the motor vehicle, a connecting member connected to the wiper arm, a rubber sheet sealed windshield wiper frame disposed under the connecting member, and a bridge member fixed to the connecting member and having a pair of elongated vanes extending downwardly and at an angle from a front surface thereof. Furthermore, a pair of holes disposed on the top surface of the bridge member, whereby the vanes direct the flow of air through the holes in the bridge member, increasing air pressure on the wiper blade and improving the performance of the windshield wiper assembly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 2:
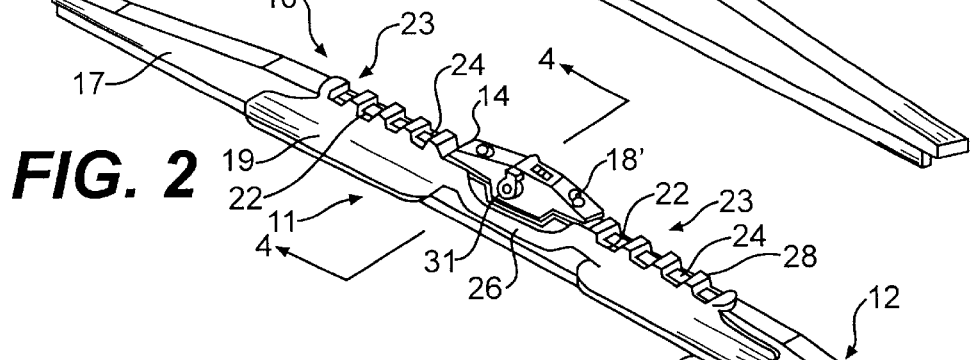
FIG. 2 is a perspective view of the winter windshield wiper assembly of the present invention.

Referring now in detail to the drawings, preferred embodiments of the present invention will be described with reference to FIGS. 2–4. The winter windshield wiper assembly 10 for use in a motor vehicle includes a windshield wiper frame 12 which carries a wiper blade 13, a connecting member 14 and a bridge member 11. The windshield wiper frame 12 is sealed by a rubber sheet 17.

Figure 1:
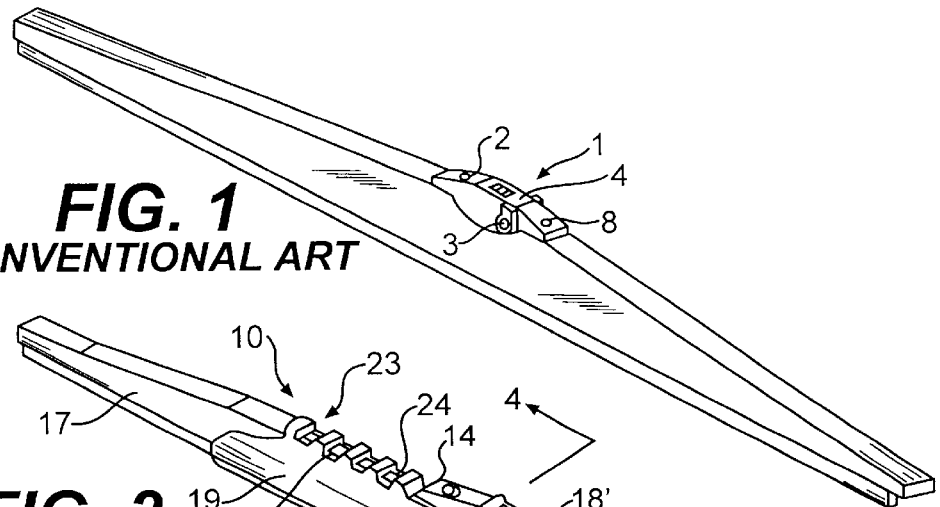
FIG. 1 shows a conventional winter windshield wiper assembly.

Referring to FIG. 1, the windshield wiper frame 12 includes the connecting member 14 secured at an intermediate portion thereof. The connecting member 14 includes a wiper arm engaging aperture 31 for securely receiving a wiper arm (not shown) of a motor vehicle (not shown). The bridge member 11 is mounted between the connecting member 14 and the windshield wiper frame 12, as can be best seen in FIG. 3. Accordingly, the winter windshield wiper assembly 10 of the present invention is capable of cleaning and wiping the convex surface of a windshield (not shown) of the motor vehicle.

The bridge member 11 includes front and rear bridges 26 and 25 and side portions 23. The side portions 23 include a front surface 11A, a top surface 11B and a rear surface 11C. The front surface 11A includes a pair of flexible, elongated vanes 19 which extend in a lengthwise direction of the bridge member 11. The vanes 19 project outwardly and downwardly from the front surface 11A, forming an angle with the front surface 11A of greater than 90°, preferably about 135° (See FIG. 4). The top surface 11B includes at least one pair of holes 24 extending through the top surface 11B. The drawings illustrate the holes as being rectangular; however, it should be appreciated that holes of other shapes could be used as well. As shown in FIGS. 2 and 3, there are preferably 2 to 4 pairs of holes 24, more preferably 4 pairs of holes. Furthermore, adjacent holes are separated by horizontal portions 28 of the top surface 11B.

Figure 5:
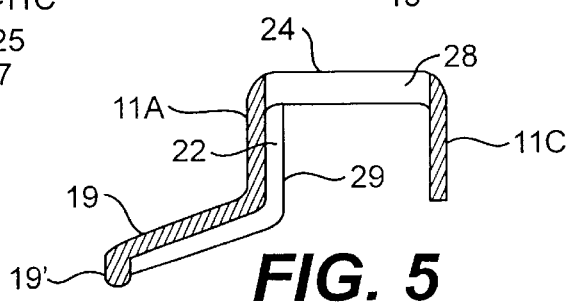
FIG. 5 is a sectional view through a portion of the winter windshield wiper assembly of the present invention.

Referring to FIG. 5, a cross-sectional view of the bridge member 11 through one of the holes 24 is illustrated. The top surface 11B extends away from the rubber sheet 17 and frame 12 to form spaces 22 between a vertical surface of the rubber sheet 17 and an inner surface of the front surface 11A. The inner surface of the front surface 11A and a lower surface of the vanes 19 include a plurality of ribs 29 formed thereon at locations between adjacent holes 24, aligned with the horizontal portions 28 of the top surface 11B. The ribs 29 contact the rubber sheet 17 so that the spaces 22 are formed between adjacent ribs. The spaces 22 form channels between adjacent ribs which are in communication with adjacent holes 24 for receiving a flow of air guided from the vanes 19. In addition to forming channels for the flow of air, the ribs also provide strength to the front surface 11A and the vanes 19.

Figure 4:
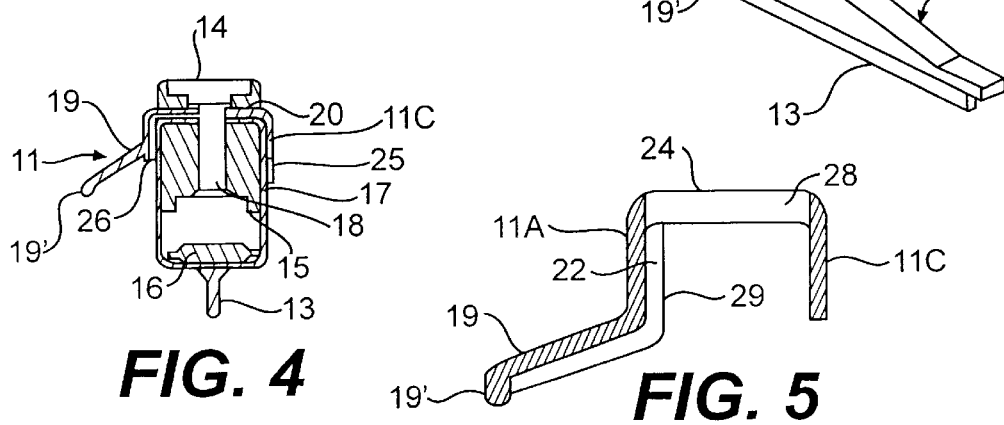
FIG. 4 is a sectional view, taken along line 4—4 in FIG. 2.

Referring to FIG. 4, the flexible, elongated vanes 19 each include a flexible bent lip 19' formed thereon. The vanes 19 direct a flow of air when the motor vehicle is moving and the winter windshield wiper assembly 10 is operating, to apply a force to the bridge member 11. The vanes 19 direct the flow of air through the holes 24 in the bridge member 11, increasing air pressure on the wiper blade 13 and improving the performance of the windshield wiper assembly 10. The vane-directed air stream scatters and hits the convex surface of the windshield of the motor vehicle and pressure is exerted on the bent lips 19', which aid to apply the force to the bridge member 11. The openings 24 are needed to maintain a pressure balance on the two sides of the bendable lip of the blade so as to achieve an effective cleaning operation. As a result, the winter windshield wiper assembly 10 is forced into strong contact with the windshield of the motor vehicle so as to effectively clean and wipe the convex surface of the windshield, even though snow or other precipitation is disposed on the surface of the windshield. As a result, the performance of the winter windshield wiper assembly 10 is greatly improved.

The top surface 11B is separated into two pieces connected together by the front and rear bridges 26, 25. A pair of horizontally extending portions 21 are formed on the top surface 11B. The horizontally extending portions 21 extend toward each other and into a space between the two pieces of the top surface 11B. The horizontally extending portions 21 are connected to each other by an arcuate member 27. The horizontally extending portions 21 and the arcuate member 27 are for receiving the connecting member 14 thereon. Rivets 18 extend through the connecting member 14 and the horizontally extending portions 21 in order to attach the connecting member 14 and the bridge member 11 to the frame 12.

Figure 3:
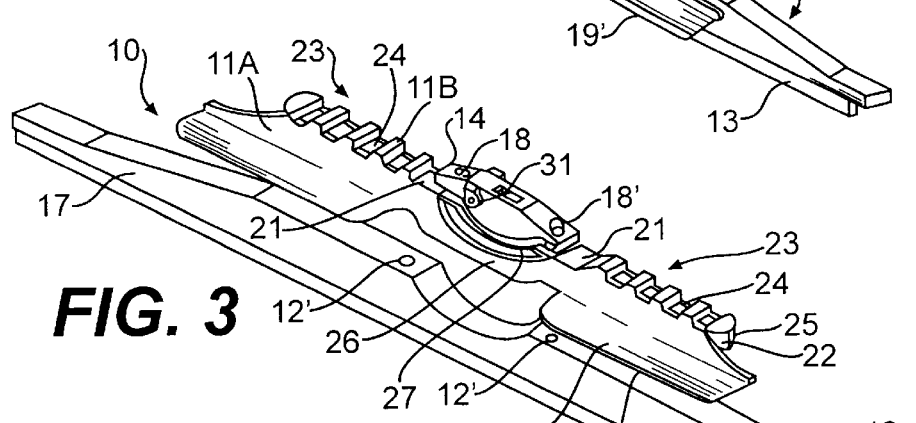
FIG. 3 is an exploded perspective view of the winter windshield wiper assembly of the present invention.

As shown in FIGS. 3 and 4, the connecting member 14, which is the same as the conventional connecting member 4 in FIG. 1, includes a pair of rivet-engaging apertures 18' for receiving a corresponding rivet 18. The rivets 18 pass through the rivet-engaging apertures 18' on the connecting member 14, the rubber sheet 17, and the rivet-engaging apertures 12' formed in a primary yoke 15 of the frame 12. The rubber sheet 17 seals the primary yoke 15 and second and third yokes (not shown) as well as a flexible mounting stay 16 for mounting the wiper blade 13.

If it is required to attach the bridge member 11 having the elongated vanes 19 thereon to a conventional winter windshield wiper assembly, the existing rivets in the connecting member 14 can be removed and the bridge member 11 attached with new rivets or with a removable fastener.

Accordingly, the winter windshield wiper assembly 10 according to the present invention includes the bridge member 11, having the flexible, elongated vane members 19 thereon and holes 24 therethrough, which is attached between the connecting member 14 and the rubber sheet 17 covering the windshield wiper frame 12. The flexible, elongated vane members 19 direct an air stream to scatter and hit the snow covered surface and/or the convex surface of the windshield of the motor vehicle, to apply a more direct force to the winter windshield wiper assembly 10 during operation. This structure provides a winter windshield wiper assembly which effectively cleans and wipes the convex surface of the windshield of a motor vehicle, even though snow is on the surface of the windshield.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A winter windshield wiper assembly for a motor vehicle, said assembly comprising:

a connecting member having an aperture therein for securely receiving a wiper arm attached to a body of the motor vehicle;

an elongated frame assembly including at least a primary yoke, said frame assembly being enclosed by a flexible sheet, said connecting member being coupled by at least one fastener to said primary yoke with said sheet disposed therebetween;

an elongated wiper blade supported by said frame assembly;

a bridge member having a front surface, a top surface and a rear surface, said front surface including a pair of elongated vanes extending downwardly and at an angle from the front surface, said top surface including a plurality of holes extending therethrough, a space formed between the frame assembly and an inner surface of the front surface for imparting a biasing force to said blade by an air flow thereover, whereby the pair of vanes direct the flow of air through the plurality of holes, thereby increasing air pressure on the wiper blade and improving the performance of the windshield wiper assembly; and wherein said inner surface of said front surface includes ribs formed thereon, said ribs being in contact with said flexible sheet.

2. The winter windshield wiper assembly according to claim 1, wherein said elongated vanes include a bent lip for directing the air flow in conjunction with a surface of said elongated vane.

3. The winter windshield wiper assembly according to claim 1, wherein said top surface includes a pair of extended portions and said bridge member is coupled to said connecting member through said pair of extended portions of said top surface.

4. The winter windshield wiper assembly according to claim 1, wherein said top surface of said bridge member includes a pair of extended surfaces connected to each other by an arcuate portion, said extended surfaces and said arcuate portion for receiving said connecting member thereon.

5. The winter windshield wiper assembly according to claim 1, wherein said plurality of holes are elongated in a direction transverse to a length of said bridge member, said ribs being formed between adjacent of said plurality of holes to form air channels between said inner surface of said front surface and said rubber sheet, said air channels being in communication with respective of said plurality of holes.

6. A winter windshield wiper assembly for a motor vehicle, said assembly comprising:

a connecting member having an aperture therein for securely receiving a wiper arm attached to a body of the motor vehicle;

an elongated frame assembly, said frame assembly enclosed by a flexible sheet, said connecting member being coupled to said frame assembly with said sheet disposed therebetween;

an elongated wiper blade supported by said frame assembly;

a bridge member having a front surface and a top surface, said front surface including at least one elongated vane extending from said front surface, said top surface including at least one hole extending therethrough, a space is formed between a surface of the flexible sheet and an inner surface of the front surface, whereby the vane directs a flow of air through said at least one hole, thereby increasing air pressure on the wiper blade and improving the performance of the windshield wiper assembly; and wherein said inner surface of said front surface includes ribs formed thereon, said ribs being in contact with said flexible sheet.

7. The winter windshield wiper assembly according to claim 6, wherein said elongated vane includes a bent lip for directing the air flow in conjunction with a surface of said elongated vane.

8. The winter windshield wiper assembly according to claim 6, wherein said top surface includes a pair of extended portions and said bridge member is coupled to said connecting member through said pair of extended portions of said top surface.

9. The winter windshield wiper assembly according to claim 6, wherein said top surface of said bridge member includes a pair of extended surfaces connected to each other by an arcuate portion, said extended surfaces and said arcuate portion for receiving said connecting member thereon.

10. The winter windshield wiper assembly according to claim 6, wherein said plurality of holes are elongated in a direction transverse to a length of said bridge member, said ribs being formed between adjacent of said plurality of holes to form air channels between said inner surface of said front surface and said rubber sheet, said air channels being in communication with respective of said plurality of holes.

11. A winter windshield wiper assembly for a motor vehicle, said assembly comprising:

a connecting member having an aperture therein for securely receiving a wiper arm attached to a body of the motor vehicle;

an elongated frame assembly including at least a primary yoke, said frame assembly being enclosed by a flexible sheet, said connecting member being coupled by at least one fastener to said primary yoke with said sheet disposed therebetween;

an elongated wiper blade supported by said frame assembly;

a bridge member having a front surface, a top surface and a rear surface, said front surface including a pair of elongated vanes extending downwardly and at an angle from the front surface, said top surface including a plurality of holes extending therethrough, a space formed between the frame assembly and an inner surface of the front surface for imparting a biasing force to said blade by an air flow thereover, whereby the pair of vanes direct the flow of air through the plurality of holes, thereby increasing air pressure on the wiper blade and improving the performance of the windshield wiper assembly; and wherein said at least one fastener is a pair of rivets, said connecting member being connected to said primary yoke of said elongated frame assembly by said rivets passing through said connecting member.

12. The winter windshield wiper assembly according to claim 11, wherein said extended portions of said top surface each include rivet-engaging apertures for receiving said rivets therethrough.

13. A winter windshield wiper assembly for a motor vehicle, said assembly comprising:

a connecting member having an aperture therein for securely receiving a wiper arm attached to a body of the motor vehicle;

an elongated frame assembly, said frame assembly enclosed by a flexible sheet, said connecting member being coupled to said frame assembly with said sheet disposed therebetween;

an elongated wiper blade supported by said frame assembly;

a bridge member having a front surface and a top surface, said front surface including at least one elongated vane extending from said front surface, said top surface including at least one hole extending therethrough, a space is formed between a surface of the flexible sheet and an inner surface of the front surface, whereby the vane directs a flow of air through said at least one hole, thereby increasing air pressure on the wiper blade and improving the performance of the windshield wiper assembly; and wherein said connecting member is connected to said frame assembly by a pair of rivets passing through said connecting member.

14. The winter windshield wiper assembly according to claim 13, wherein said extended portions of said top surface each include rivet-engaging apertures for receiving said rivets therethrough.

* * * * *